US012483561B2

(12) United States Patent
Benkreira et al.

(10) Patent No.: US 12,483,561 B2
(45) Date of Patent: Nov. 25, 2025

(54) SYSTEMS AND METHODS FOR PROVIDING REAL-TIME DIGITAL AUTHORIZATION AND MANAGEMENT

(71) Applicant: Capital One Services, LLC, McLean, VA (US)

(72) Inventors: Abdelkader M'Hamed Benkreira, Brooklyn, NY (US); Tyler Maiman, Melville, NY (US); Brendan Way, Brooklyn, NY (US)

(73) Assignee: Capital One Services, LLC, McLean, VA (US)

( * ) Notice: Subject to any disclaimer, the term of this patent is extended or adjusted under 35 U.S.C. 154(b) by 188 days.

(21) Appl. No.: 18/204,729

(22) Filed: Jun. 1, 2023

(65) Prior Publication Data

US 2024/0380758 A1   Nov. 14, 2024

Related U.S. Application Data

(60) Provisional application No. 63/465,996, filed on May 12, 2023.

(51) Int. Cl.
*H04L 9/40* (2022.01)
(52) U.S. Cl.
CPC .................................. *H04L 63/107* (2013.01)
(58) Field of Classification Search
CPC ..................................................... H04L 63/107
See application file for complete search history.

(56) References Cited

U.S. PATENT DOCUMENTS

| | | | |
|---|---|---|---|
| 11,080,724 B1* | 8/2021 | Arnott | H04W 4/021 |
| 11,341,482 B2* | 5/2022 | Howard | G06Q 20/3674 |
| 11,769,130 B2* | 9/2023 | Jayachandran | G06Q 20/4012 |
| | | | 705/17 |
| 11,854,007 B2* | 12/2023 | Chopra | G06Q 20/401 |
| 2014/0258022 A1 | 9/2014 | Zamer et al. | |
| 2015/0058109 A1 | 2/2015 | Lange | |
| 2018/0121913 A1* | 5/2018 | Unnerstall | G06Q 20/405 |
| 2018/0262503 A1* | 9/2018 | Dawson | H04L 9/3239 |
| 2020/0126151 A1 | 4/2020 | Botella | |
| 2020/0143347 A1 | 5/2020 | Jankowski et al. | |
| 2021/0097523 A1* | 4/2021 | Phillips | G06Q 20/3821 |
| 2021/0377247 A1* | 12/2021 | Nigro | H04L 9/3239 |
| 2024/0221009 A1* | 7/2024 | Wellmann | G06N 20/20 |
| 2024/0380758 A1* | 11/2024 | Benkreira | H04L 63/107 |

* cited by examiner

*Primary Examiner* — Harris C Wang
(74) *Attorney, Agent, or Firm* — Sterne, Kessler, Goldstein & Fox P.L.L.C.

(57) ABSTRACT

Systems and methods are disclosed herein for real-time digital authorization. According to some embodiments, a method includes receiving, from a user device, user information comprising one or more categories. The method further includes transferring an amount corresponding to the user information. The method also includes obtaining, from a location sensor of the user device, location data including a global position system (GPS) location for the user device and identifying one or more entities based on a correlation between the location data and a parameter defining locations of the one or more entities. The method further includes performing a mapping operation between the one or more entities and the user information and receiving a request from an entity device. The method further includes transmitting a message to the entity device indicating an operation status.

20 Claims, 5 Drawing Sheets

SYSTEMS AND METHODS FOR PROVIDING REAL-TIME DIGITAL AUTHORIZATION AND MANAGEMENT

CROSS REFERENCE TO RELATED APPLICATIONS

This application is claims priority to U.S. Provisional Application No. 63/465,996, filed on May 12, 2023, the contents of which are incorporated by reference herein in their entirety.

TECHNICAL FIELD

Aspects of the present disclosure relate to systems and methods for providing real-time digital authorization and management of operations that reduce institutional computational bandwidth based on processed user information.

BACKGROUND

A temporary authorization transaction is a transaction that is the result of a merchant requesting to confirm, from a financial institution, that an account associated with a consumer (and/or consumer's account) is active and has a sufficient available balance to accommodate a transaction. This request creates a temporary authorization transaction that appears in a consumer account. The temporary authorization transaction is not always equal to the actual amount, but rather it represents an anticipated amount the merchant uses until the actual transaction is processed. The actual transaction amount will be charged to the account once the merchant's bank and all intermediary banks finish processing the transaction. Thereafter, the temporary authorization is removed from the account within a time period, typically 30 days, after it first appears. Moreover, any/all temporary authorizations temporarily reduce the consumer account's available balance by the anticipated amount.

The temporary authorization transaction results in unnecessary transaction communications, e.g., via API calls, being received at the financial institution's backend infrastructure (e.g., processing servers). This process is inefficient and creates computational burden on the institution's processing servers due to the multitude of API calls associated with the transaction. For example, a temporary authorization transaction may require a number of API calls being exchanged between a merchant and the processing servers, including, for example, API calls associated with checking an available amount, API calls associated with requesting a hold on a predetermined amount, API calls associated with acknowledging the amount and the hold operations, API calls associated with charging the remaining amount, and API calls associated with removing the hold amount.

The above-mentioned API calls associated with the temporary authorization transaction add significant computational burdens on the parties (e.g., back end communication via API calls for authentication, authorization, and confirmation of transaction amount, etc.). For an institution processing thousands or hundreds of thousands of such transactions on daily basis, this authorization process creates a significant burden and requires significant processing power.

DETAILED DESCRIPTION

Examples of applications for the below methods, media, and systems are numerous, but a few are given here merely to indicate possible uses. Other applications will be readily apparent to one of skill in the relevant arts and are likewise contemplated by this disclosure. Moreover, description of "an embodiment" or "one embodiment" should not be construed as limiting the scope of the disclosure, as elements, sub-elements and features of a given embodiment may also be used in other embodiments of the disclosure. While methods described herein may have steps described in a specified order, it will be understood that some of those steps may be re-arranged or performed in a different order. Additionally, embodiments may be given describing applications to particular industries or commercial fields, but scope of the disclosure is not so limited.

Descriptions are given with reference to the figures included herein. When possible and for clarity, reference numbers are kept consistent from figure to figure. Some of the figures are simplified diagrams, which are not to be interpreted as drawn to scale or spatially limiting for the described embodiments. Where appropriate, the particular perspective or orientation of a figure will be given to increase understanding of the depicted features.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

According to some embodiments of the present disclosure, systems and methods are devised for performing digital authorization operations that allow a user/consumer to preconfigure spending actions. Such systems and methods can reduce the dependence on, and/or eliminate the use of, temporary authorization transactions required for authorizing purchases. Eliminating the authorization transaction can lead to several benefits for backend infrastructure of financial institutions, for consumers, and for merchants. First, it can lead to a reduction in overall system transaction bandwidth usage (e.g., reduced API calls between merchant terminals, user terminals and financial organization backend servers, charging, tracking, and removing of temporary authorization transactions). In doing so, system resources can be more free to perform other activities (e.g., fraud detection) and/or allow a financial institution to scale back computing resources necessary to run such operations. Second, a backend server system of a financial institution can more expediently authorize a transaction that has been pre-allocated by a consumer. Third, a backend server system of a financial institution can more readily enable a consumer to track and monitor consumer spending. FIGS. 1-5 describe systems and methods for performing digital authorization operations.

Figure 1:
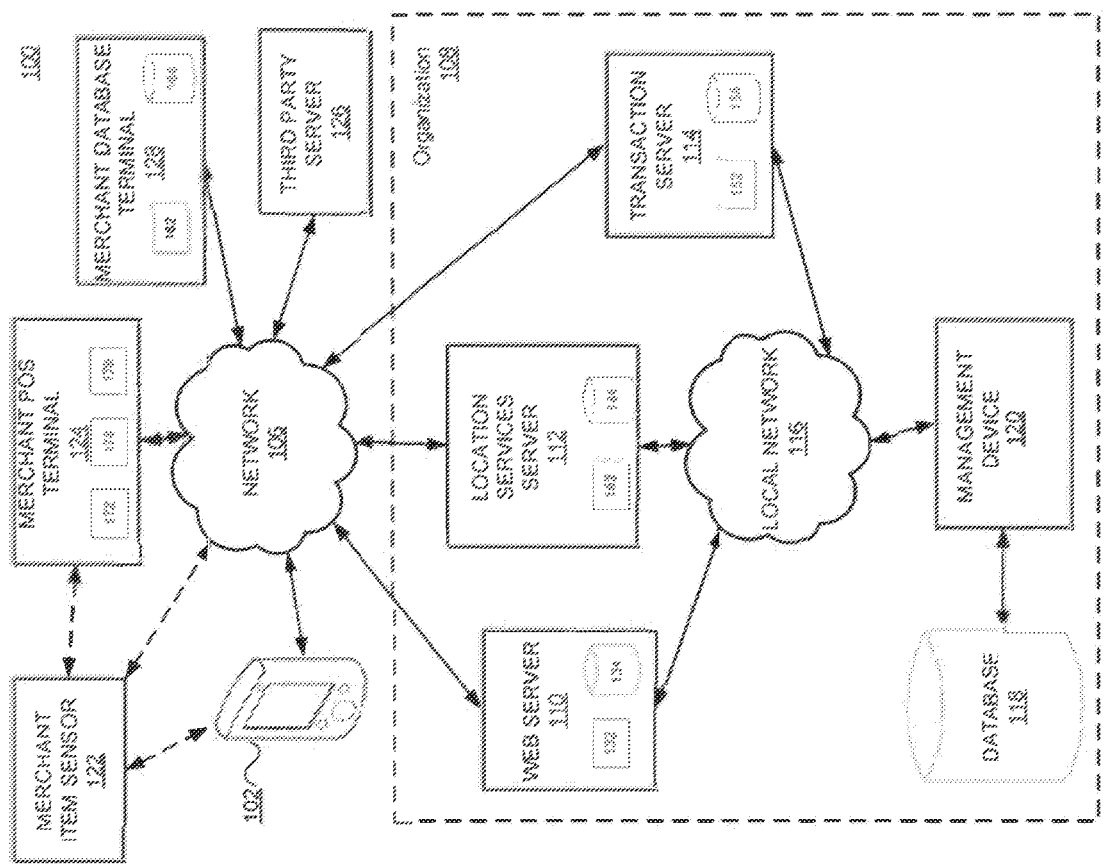
FIG. 1 is a diagram of an example system that may be used for digital authorization and management, according to some embodiments.

FIG. 1 is a diagram of a system 100 that may be configured to perform one or more processes that may be used for digital authorization and management, and can provide users with the ability to set, track and monitor their purchase authorization amounts in real time. The components and arrangements shown in FIG. 1 are not intended to limit the disclosed embodiments as the components used to implement the disclosed processes and features may vary. It can be appreciated that the improved systems described herein provide the required transactional authorization for consumers to engage in purchase activities while reducing the computational bandwidth typically associated with a temporary authorization request.

As shown in FIG. 1, system 100 may include a user device 102, a merchant point of sale (hereinafter "POS") terminal 124, a merchant item sensor 122, a merchant database terminal 128, a third party server 126, a network 106, and an organization 108 with a back-end infrastructure including, for example, a web server 110, a location services server 112, a transaction server 114, a local network 116, a account management device 120, and a database 118.

In some embodiments, a user may operate user device 102. User device 102 can include a mobile device, smart phone, personal computer, tablet computer, laptop computer, telephone, PSTN landline, smart wearable device, voice command device, other mobile computing device, or any other device capable of communicating with network 106 and ultimately communicating with one or more components of organization 108 or with third party server 126. In some embodiments, user device 102 may include or incorporate electronic communication devices for hearing or vision impaired users. Users may include individuals such as, for example, subscribers, clients, prospective clients, or users of organization 108, such as individuals who have obtained, will obtain, or may obtain a product, service, or consultation from organization 108. For example, a user operating user device 102 may hold an account at organization 108, which may be a financial institution. According to some embodiments, user device 102 may include one or more sensors for obtaining biometric data associated with the user, such as a fingerprint scanner, a microphone and/or digital camera, a geographic location sensor for determining the location of the device, an input/output device such as a transceiver for sending and receiving data, a display for displaying digital images, one or more processors including an authorization processor, and a memory in communication with the one or more processors. According to some embodiments, user device 102 may include one or more sensors for obtaining product data associated with a product the user may wish to purchase, such as a microphone, a digital camera, a geographic location sensor for determining the location of the device, an input/output device such as a transceiver for sending and receiving data, a display for displaying digital images, one or more processors including an authorization processor, and a memory in communication with the one or more processors.

Network 106 may be of any suitable type, including individual connections via the internet such as cellular or WiFi networks. In some embodiments, network 106 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, or LAN. Because the information transmitted may be personal or confidential, security concerns may dictate one or more of these types of connections be encrypted or otherwise secured.

Network 106 may comprise any type of computer networking arrangement used to exchange data. For example, network 106 may be the Internet, a private data network, virtual private network using a public network, and/or other suitable connection(s) that enables components in system environment 100 to send and receive information between the components of system 100. Network 106 may also include a public switched telephone network ("PSTN") and/or a wireless network.

Third party server 126 may comprise a computer system associated with an entity other than organization 108 and users that performs one or more functions associated with the individual and organization 108. For example, third party server 126 can comprise a user verification system that allows a user of user device 102 to verify their identity in order to interact with organization 108. In some embodiments, third party server 126 may be used in conjunction with authentication of a user of a mobile application running on user device 102. For example, third party server 126 may be associated with a certification authority (CA) that certifies communications between devices in system 100 (e.g., user device 102 and organization 108). In some embodiments, third party server 126 may be a server hosted by organization 108. According to some embodiments, third party server 126 may be a server hosted by a party or entity other than organization 108. In some embodiments, third party server 126 may use protocols such as OAuth and OpenIDConnect in order to verify the identity of a user of a mobile application running on user device 102. In some embodiments, for example, third party 126 server may be a server associated with the manufacture of user device 102.

Organization 108 may include an entity such as a business, corporation, individual, partnership, or any other entity that provides one or more of goods, services, and consultations to individuals such as users. Organization 108 may include one or more servers and computer systems for performing one or more functions associated with products and/or services that organization 108 provides. Such servers and computer systems may include, for example, web server 110, location services server 112, account management device 120, and/or transaction server 114, as well as any other computer systems necessary to accomplish tasks associated with organization 108 or the needs of users.

Web server 110 may include a computer system configured to generate and provide one or more websites accessible to customers, as well as any other individuals involved in organization 108's normal operations. Web server 110 may include a computer system configured to receive communications from user device 102 via for example, a mobile application, a chat program, an instant messaging program, a voice-to-text program, an SMS message, email, or any other type or format of written or electronic communication. Web server 110 may have one or more processors 132 and one or more web server databases 134, which may be any suitable repository of website data. Information stored in web server 110 may be accessed (e.g., retrieved, updated, and added to) via local network 116 and/or network 106 by one or more devices of system 100. According to some embodiments, web server 110 may host websites, data or software applications that user device 102 may access and interact with. For example, web server 110 may provide a website, web portal or software application that allows a user of user device 102 to access or view account information associated with one or more financial accounts of the user. In some embodiments, web server 110 may receive and forward communications or portions of communications between user device 102 and components of system 100, such as location services server 112, transaction server 114, database 118 and/or account management device 120.

According to some embodiments, web server 110 may be configured to transmit data and/or messages from user device 102 to organization 108, via for example, a mobile application that has been downloaded on user device 102.

In some embodiments, web server 110 may track and store event data regarding interactions between user device 102 associated with a user and organization 108. For example, web server 110 may track user interactions such as login requests, login attempts, successful logins, trusted device requests, updates to budget categories, updates to user accounts, and any other types of interaction that may occur between user device 102 and organization 108.

Location services server 112 may include a computer system configured to track the location of user device 102 based on information and data received from user device 102. For example, location services server 112 may receive location data from user device 102, such as global positioning satellite (GPS) data comprising the coordinates of the device, RFID data associated with known objects and/or locations, or network data such as the identification, location, and/or signal strength of a wireless base station (e.g., Wi-Fi router, cell tower, etc.) connected to user device 102 that may be used to determine the location of user device 102. According to some embodiments, location services server 112 may store geofencing information that represents a designed location or area. As those of skill in the art will appreciate, a geofence may be a virtual geographic boundary that, when crossed by user device 102, may trigger system 100 to execute one or more actions. According to some embodiments, the contours of a geofence may be predetermined; for example, location services server 112 may receive one or more predetermined geofences that are associated with respective locations from a third party. For example, location services server 112 may receive data representative of a geofence around a particular store from an organization associated with the store that determined the location of the geofence. In some embodiments, the contours of a geofence may be determined by receiving (e.g., from a user of system 100) the location of a point (e.g., longitude and latitude) and a radius, and setting the contours of the geofence to be equal to the location of a circle draw around the point at the specified radius. In some embodiments, a geofence may be specified by a user of system 100 by, for example, drawing the geofence onto a virtual map or otherwise inputting the location of the geofence.

Location services server 112 may have one or more processors 142 and one or more location services databases 144, which may be any suitable repository of location data. Information stored in location services server 112 may be accessed (e.g., retrieved, updated, and added to) via local network 116 and/or network 106 by one or more devices of system 100. In some embodiments, location services server processor 142 may be used to determine the location of user device 102, whether user device 102 has crossed a particular geofence, or whether user device 102 is inside or outside of an area designated by a particular geofence. In some embodiments, location services server 112 may be configured to send messages and/or data to other devices, such as for example, user device 102 or account management device 120, upon determining that user device 102 has crossed a specified geofence or entered an area encompassed by a specified geofence. For example, in some embodiments, location services server 112 may be configured to trigger system 100 to send to user device 102 a notification that one or more categories (e.g., budget categories) of the user's information (e.g., purchase authorization amount input by the user at an earlier time) are associated with the user's current location and may provide, for example, the details of the categories, such as the amount of the money remaining in the category (e.g. purchase authorization amount remaining for a specified merchant/store/shopping center, etc.), the amount of time remaining in the budget cycle (where applicable), and other information that may be relevant to the user. It can be appreciated that the amount of time may be set by the user, or alternatively, may be an open ended amount of time. For example, the amount of time may be set for one month (or other time periods) to allow the user to manage budgets and authorizations. Alternatively, once the user sets a purchase authorization amount, authorization for transactions associated with the purchase authorization amount (e.g., at the specified merchant for example) may be authorized until the purchase authorization amount is met.

In some embodiments, location server 112 may be configured to trigger system 100 to send to user device 102 a notification to set one or more budget categories of the user's information (e.g., a purchase authorization amount) based on the user's current location. For example, location server 112 may detect that the user is within a geofence location or is in the vicinity of a store from which the user may have previously purchased one or more items. Accordingly, location server 112 may transmit a notification to user device 102 alerting the user to set a purchase authorization amount if a purchase authorization amount is not set.

According to some embodiments, location services server 112 may receive data representative of a location that is associated with a merchant. For example, account management device 120 may provide data to location services server 112 representative of a location of a particular store that is associated with a particular budget category (e.g., purchase authorization amount set for a merchant like Adidas®). Location services server 112 may generate, receive, or access geofence information associated with the received location and may monitor location data associated with the user device 102 to determine when the user device 102 has entered the location. Location services server 112 may determine that user device has entered the location by determining that, for example, user device has crossed over the geofence associated with the merchant location. In this way, location services server 112 may determine when a user has entered a merchant location or proximity to a relevant merchant associated with the user's budget categories. In some embodiments, location services server 112 may continuously (e.g., periodically or regularly) receive the location of user device 102 from a mobile application running on user device 102. For example, in some embodiments, the user may have an application running on a user device 102 that continuously sends location data to location services server 112. In some example embodiments, location services server 112 may receive the location of user device 102 from a mobile application running on user device 102 upon opening of the application. In some embodiments, a beacon or other similar device may be installed at a merchant location, and may transmit a signal that, when received by user device 102, may trigger an application running on user device 102 to transmit the location of user device 102 to location services server 112.

In some embodiments, upon detection of the user's location within the geofence of a merchant, location services server 112 may transmit a preauthorization notification to merchant POS terminal 124 indicating that the user has pre-authorized a transaction, thereby eliminating the need for the merchant POS terminal 124 to initiate a request for temporary authorization transaction. This step, for example, reduces the system load caused by multiple API calls being initiated and processed between components of system 100 (e.g., organization 108, merchant POS terminal 124 and and/or third party server 126). For example, API calls that can be reduced or eliminated entirely include, but are not limited to, the temporary authorization request and subsequent response, and any other third party certification of the communication of the involved communication. Other system transactions that may be eliminated by the purchase authorization can include the elimination of the placement and subsequent removal of the temporary authorization charge associated with the transaction at system 100 for example.

Transaction server 114 may include a computer system configured to process one or more transactions involving a financial account associated with a customer. For example, a transaction may be a purchase of goods or services from a merchant that is made in association with a financial account, such as a bank account or a card account. In some aspects, the card account may be an account associated with a debit card, gift card, digital card, credit card, or the like. Transactions may be initiated at merchant POS terminal 124 by for example, swiping a credit card or making a payment using financial account information stored on a smartphone and/or in a digital wallet. Such transactions may be made at merchant locations or at a merchant website via the internet. Transactions may be made using for example, a credit card, a debit card, a gift card, or other ways of conveying financial account numbers and/or account credentials that are known in the art. Transaction server 114 may have one or more processors 152 and one or more transaction server databases 154, which may be any suitable repository of transaction data. Information stored in transaction server 114 may be accessed (e.g., retrieved, updated, and added to) via local network 116 and/or network 106 by one or more devices of system 100. According to some embodiments, transaction server 114 may store account numbers, such as primary account numbers (PANs) associated with credit/debit cards or other such financial account numbers, that may be used in transaction monitoring as described in greater detail below. In some embodiments, transaction server 114 may store rules, conditions, restrictions or other such limitations that are associated with a user's budget information and that may be applied to an attempted transaction to determine if the attempted transaction should be authorized or cancelled.

According to some embodiments, transaction server 114 may receive transaction authorization data and/or requests from one or more merchant POS terminals 124 based on an attempted transaction made at a merchant. For example, if a purchaser swipes a credit card at a card reader associated with merchant POS terminal 124 or types in a credit card number on a website to make a purchase, merchant POS terminal 124 would not need to generate a initial transaction authorization request (as there is the need for the usual temporary authorization transaction request) and transmit such transaction authorization request to transaction server 114. In aspects, the transaction authorization results jn a hold, which reduces the available balance in the account. The hold remains in effect until the completed purchase transaction is received from the merchant. A temporary authorization may be a temporary hold (anywhere from 1 to 30 days, for example) placed on a portion of the funds or available credit in a cardholder's account. Accordingly, when the user sets a purchase authorization amount associated with the merchant, for example, transaction server 114 may transfer that amount into a purchase authorization account associated with the user. Such transaction authorization requests may include data indicative of a financial account (e.g., a PAN or account number) used to make a purchase, a time stamp, and merchant category code ("MCC") associated with the merchant and/or location at which the attempted purchase was made. According to some embodiments, transaction server 114 may determine whether to authorize a transaction based on the transaction authorization request and any conditions or limitations associated with the user purchase authorization information. In some aspects, the transacted funds do not leave the account until the authorization is completed.

In some embodiments, the transaction authorization request may include conditions such as an amount of money that can be spent in a given time period on a class of items and a list of merchants associated with the class of items. Thus, in some embodiments, transaction server 114 may identify attempted transactions made based on transaction authorization data, and then may further determine whether the attempted transaction is pre-authorized by applying the associated purchase authorization limitations to the data associated with the transaction authorization request. Attempted transactions that satisfy the associated purchase authorization limitations may be approved. Attempted transactions that do not satisfy the associated purchase authorization limitations may require real time approval from the user in order to be approved, or may be processed using a traditional authorization hold.

In some embodiments, in response to authorizing a transaction, transaction server 114 may store a record of the transaction and update account information such as the balance of the account or the balance remaining in the relevant budget category (e.g., purchase authorization amount). In one example, an amount of funds corresponding to the purchase authorization amount may be moved from a general spending account of the user, and placed in a separate account associated with the user's account that can be adjusted according to the authorized transaction. Although the preceding description was made with respect to a credit card, it should be understood that other embodiments relating to other types of payment methods such as debit cards, gift cards, and any other such type of financial account, including online financial accounts, are contemplated as well. In some aspects, the amount setting is akin to earmarking a portion of a credit limit to a pre-authorized purchase.

According to some embodiments, transaction server 114 may determine the identity of a merchant associated with an attempted transaction based on the MCC included in the transaction authorization data. For example, in some embodiments, transaction server 114 may be configured to determine the identity of the business, such as a particular chain of fast food restaurants, retail stores, etc., based on the MCC. In some embodiments, transaction server 114 may be configured to determine the location or address of the attempted purchase based on the MCC or other data provided with a transaction authorization request. According to some embodiments, if the identity of the merchant may not be determined solely based on the MCC, it may be determined based on the MCC in conjunction with the location information derived from the transaction authorization request (as described herein). In some embodiments, transaction server 114 may be configured to determine the type of business at which the attempted transaction is made based on the MCC, such as a restaurant, gas station, book store, movie theater, retail store, and the like.

According to some embodiments, transaction server 114 may be configured to send and/or initiate payments from a financial account in response to authorizing an attempted transaction associated with the account. For example, if transaction server 114 authorizes a particular transaction made using a specified financial account at a merchant, then transaction server 114 may generate an instruction to debit the specified financial account with the amount of the transaction and credit an account associated with the merchant with the same amount. Accordingly, this may be done without the need for processing a temporary authorization transaction as described herein. According to some embodiments, if the attempted purchase would cause the user to violate a budget rule, e.g., purchase authorization not set, or a purchase authorization amount is exceeded by the pending transaction, transaction server 114 may require user authorization before initiating payments. For example, if the attempted purchase would cause the user to go over budget for the relevant purchase authorization amount, system 100 may send a request to the user to authorize or cancel the transaction due to the violation of the purchase authorization amount, and transaction server 114 may wait to initiate payment until system 100 receives authorization from the user.

According to some embodiments, transaction server 114 may be configured to send a cancellation message cancelling an attempted transaction associated with the account in response to system 100 receiving a cancellation message from the user. According to some embodiments, if the attempted purchase would cause the user to violate a purchase authorization amount, transaction server 114 may require user authorization before initiating payments. For example, if the attempted purchase would cause the user to go over budget for the relevant purchase authorization amount, system 100 may send a request to the user to authorize or cancel the transaction due to the violation of the budget rule, and transaction server 114 may wait to initiate payment until system 100 receives authorization from the user. If the user wishes to cancel the transaction, transaction server 114 may then send a cancellation message instead of initiating payment.

Local network 116 may comprise any type of computer networking arrangement used to exchange data in a localized area, such as WiFi, Bluetooth™ Ethernet, and other suitable network connections that enable components of organization 108 to interact with one another and to connect to network 106 for interacting with components in system environment 100. In some embodiments, local network 116 may comprise an interface for communicating with or linking to network 106. In some embodiments, components of organization 108 may communicate via network 106, without a separate local network 116.

Account management device 120 may comprise one or more computer systems configured to compile data from a plurality of sources, such as location server 110, communication server 112, and transaction server 114, correlate and analyze the compiled data in real time, arrange the compiled data, generate derived data based on the compiled data, and storing the compiled and derived in a database such as database 118. Account management device 120 is further described herein with reference to FIG. 2. According to some embodiments, database 118 may be a database associated with organization 108 that stores a variety of information relating to users, transactions, and business operations. Database 118 may also serve as a back-up storage device and may contain data and information that is also stored on, for example, databases 134, 144, 154, 260, 270, and 280. Database 118 may be accessed by account management device 120 and may be used to store the budget information that is associated with user accounts. Additionally, in some alternate embodiments, database 118 may be accessed by account management device 120 and may be used to store known biometric data associated with a user.

Merchant database terminal 128 may have one or more processors 162 and one or more merchant databases 164, which may be any suitable repository of merchant data. Merchant database terminal 128 may be located at the POS location, off-site at another merchant location, or at a third-party location. Information stored in merchant database terminal 128 may be accessed (e.g., retrieved, updated, and added to) via network 106 by one or more devices (e.g., transaction server 114) of system 100. In other embodiments, merchant POS terminal 124 may be configured to process online transactions on behalf of the associated merchant. Merchant database 164 may store information relating to products and services offered by merchants such as pricing, quantity, availability, discounts, reviews, and any other such generally available information that a consumer may utilize in making a purchasing decision. In some embodiments, merchant database 164 may also include location information associated with products and services. This location information may identify the location(s) that a particular product or service is available for purchase. In some embodiments, the location information may include an identification of a particular store, terminal, or kiosk that the product or service may be purchased from. According to some embodiments, merchant database 164 may be configured to classify items (e.g., items purchased in a transaction) into budget categories. In some embodiments, merchant database 164 may be configured to split up a single purchase into multiple purchases based on the type of items purchased and the budget categories associated with the items purchased.

Merchant POS terminal 124 may have one or more POS devices 172, 174, 176 that communicate with one or more devices (e.g., user device 102) of system 100 via network 106. In some embodiments, POS devices 172, 174, 176 may be devices that are configured to receive or obtain payment information from user device 102. For example, one or more POS devices 172 174, 176 may include a near-field communication interface, a Bluetooth communication interface, a WiFi communication interface, or any other such communication interface that may enable communication between merchant POS terminal 124 and user device 102. In some embodiments, one or more POS devices 172, 174, 176 may include a scanner for scanning images or data that convey payment information displayed by user device 102, an image capture device for capturing images displayed by user device 102, a card-reading device for obtaining payment information from a card (e.g., by reading a chip embedded in the card or reading information from a magnetic strip), or a keypad for receiving a user input representative of payment information (e.g., a typed credit card number).

Merchant item sensor 122 may comprise any type of sensor for obtaining information associated with one or more items offered for sale by a merchant, such as an RFID tag reader, an optical scanner, a weight sensor, a digital camera, a geographic location sensor, an input/output device such as a transceiver for sending and receiving data. Merchant item sensor 122 may be located at the merchant location. For example, in some embodiments, merchant item sensor 122 may be integrated into shopping carts located at merchant location. Merchant item sensor 122 may be also be a sensor integrated into user device 102. For example, in some embodiments, merchant item sensor 122 may be a digital camera associated with a user device. In such an embodiment, when the user puts an item into their cart, merchant item sensor 122 may capture an image or video of the item and may determine what the item is based on the image or video. In some embodiments, merchant item sensor 122 may capture an image or video of an item's barcode and may determine what the item is based barcode data.

In some embodiments, merchant item sensor 122 may be configured to communicate with compatible devices and ID tags when they are within a predetermined range. Merchant item sensor 122 may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies. For example, in some embodiments, items to be purchased may have an ID tag integrated and merchant item sensor 122 may detect that the item has been placed in the cart. In some embodiments, merchant item sensor 122 may transmit data associated with items to user device 102. For example, in some embodiments, merchant item sensor 122 may capture data relating to items put into a cart and may transmit the data to user device 102 for processing. According to some embodiments, user device 102 may use the data associated with the items to determine if purchases of such items have been pre authorized by the user. User device 102 can then notify the user (e.g., via display) of the items what items may have been pre authorized and what items have not been pre authorized. According to some embodiments, the user device notification can help expedite authorization for items where the user did not previously authorize. Additionally, according to some embodiments, merchant item sensor 122 may transmit data associated with items to merchant POS terminal 124. For example, in some embodiments, merchant item sensor 122 may capture data relating to items that a user places in their cart and may transmit the data to merchant POS terminal 124. As will be appreciated, in such an embodiment, the amount of time required to checkout may be reduced as the items would not have to be scanned by POS device 172, 174, or 176. Expediting the transaction can further be achieved in this case where a consumer can be notified of an item to be purchased that was not previously approved, and allow the consumer to approve the item while, for example, waiting in line.

Although the preceding description describes various functions of web server 110, location services server 112, transaction server 114, merchant item sensor 122, account management device 120, third party server 126, database 118, merchant database terminal 128, and merchant POS terminal 124, in some embodiments, some or all of these functions may be carried out by a single computing device.

For ease of discussion, embodiments may be described in connection with real time purchase authorization tracking and monitoring, and more particularly for tracking a user's purchases and transmitting a message to the user during the authorization of a purchase (if necessary). It is to be understood, however, that disclosed embodiments may be used in many other contexts. Further, steps or processes disclosed herein are not limited to being performed in the order described, but may be performed in any order, and some steps may be omitted, consistent with the disclosed embodiments.

Figure 2:
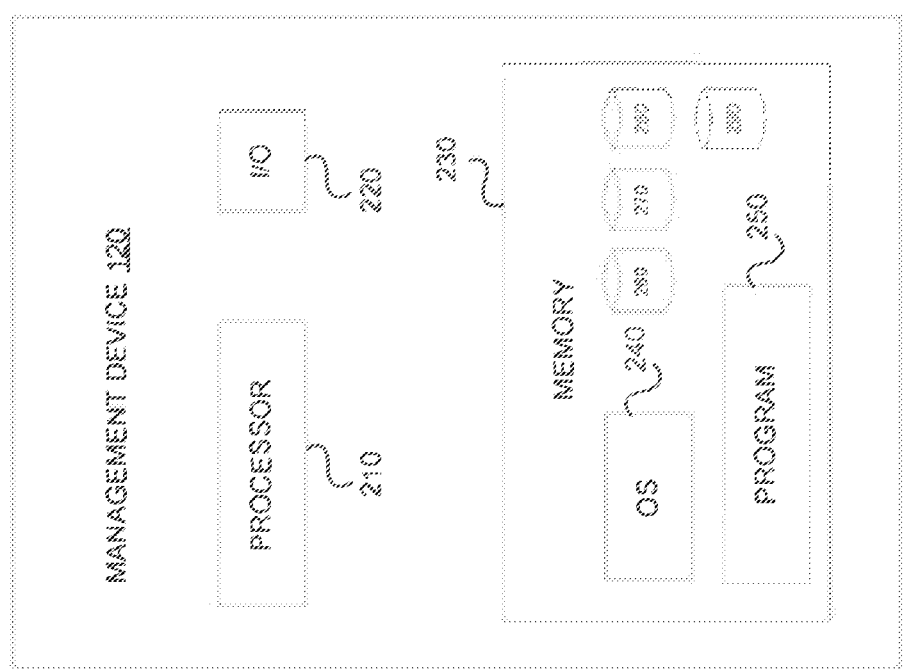
FIG. 2 is a component diagram of an example management device, according to some embodiments.

The features and other aspects and principles of the disclosed embodiments may be implemented in various environments. The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low level software instructions, such as machine code (e.g., such as that produced by a compiler) and/or high level code that can be executed by a processor using an interpreter FIG. 2 is a component diagram of a management device (e.g., account management device 120), according to some embodiments. Account management device 120 may be used to manage user information and accounts associated with the user, provide analysis of the user data, and provide recommendations based on modeled user behavior. It can be appreciated that such solutions may come in the form of recommendations to the user in real-time (at time of purchase for example) or on demand (when user is reviewing profile, purchase histories, etc.). User device 102, location server 110, communication server 112, transaction server 114, merchant POS terminal 104, and third party server 126 may have a structure and components that are similar to those described with respect to account management device 120. As shown, account management device 120 may include a processor 210, an input/output ("I/O") device 220, a memory 230 containing an operating system ("OS") 240 and a program 250. For example, account management device 120 may be a single server or may be configured as a distributed computer system including multiple servers or computers that interoperate to perform one or more of the processes and functionalities associated with the disclosed embodiments.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee', ambient backscatter communications (ABC) protocols or similar technologies.

Processor 210 may include one or more of a microprocessor, microcontroller, digital signal processor, co-processor or the like or combinations thereof capable of executing stored instructions and operating upon stored data. In some embodiments, processor 210 may be an application or authorization processor that may execute user authorization processes or other processes necessary for running an application associated with the organization 108 on user device 102. Memory 230 may include, in some implementations, one or more suitable types of memory (e.g. such as volatile or non-volatile memory, random access memory (RAM), read only memory (ROM), programmable read-only memory (PROM), for storing files including an operating system, application programs (including, for example, a web browser application, a widget or gadget engine, and or other applications, as necessary), executable instructions and data. In one embodiment, the processing techniques described herein are implemented as a combination of executable instructions and data within memory 230.

Account management device 120 may include one or more storage devices configured to store information used by processor 210 (or other components) to perform certain functions related to the disclosed embodiments. In one example account management device 120 may include memory 230 that includes instructions to enable processor 210 to execute one or more applications, such as server applications, network communication processes, and any other type of application or software known to be available on computer systems.

In one embodiment, account management device 120 may include processor 210 that may execute one or more programs 250 located remotely from system 100. For example, system 100 may access one or more remote programs 250, that, when executed, perform functions related to disclosed embodiments.

User account database 260 may include stored data relating to user accounts, such as for example, user identification information (e.g., name, age, sex, birthday, address, VIP status, key user status, preferences, preferred language, vehicle(s) owned, greeting name, channel, talking points (e.g., favorite sports team), etc.), user purchase authorization information, user budget information, bank accounts, mortgage loan accounts, car loan accounts, and other such accounts. According to some embodiments, the bank accounts may include one or more bank accounts associated with user purchase authorization information. For example, when a user sets a purchase authorization amount, the amount may automatically be deducted from the user's primary account and placed for holding in the purchase authorization account. User account data stored in user account database 260 may include account numbers, purchase authorization information, budget categories, budget balances, authorized users associated with one or more accounts, login credentials, known biometric data associated with the user, account balances, account payment history, and other such typical account information. User interaction database 270 may include stored data relating to previous interactions between organization 108 and a user. For example, user interaction database 270 may store user interaction data that includes records of previous purchase authorization information, and other such typical user interaction data. Such data may be used by organization 108 to store patterns (e.g., average amount of purchase authorization allocations) of user budgeting that may be used by the organization to educate the user on budgeting insights and make suggestions to users to help them meet identified financial goals for example and track prior expenses.

User interaction data may also include information about business transactions between organization 108 and a user. User purchase database 280 may include stored data relating to previous purchase and purchase attempts made by a user. For example, user purchase database 270 may store user interaction data that includes records of previous purchase data, previous purchase authorization amounts data, budget category data, budget balance data, and other such user interaction data. Such data may be used by organization 108 to store patterns (e.g., average amount of money allocated through purchase authorizations etc.) of user budgeting and purchasing that may be used by the organization to educate the user on budgeting insights and make suggestions to users to help them meet identified financial goals. Organization 108 may also use the user interaction data to predict/make suggestions for future purposes. For example, according to some embodiments, it may not be necessary for a user to allocate a purchase amount every time the user fills gas, or buys groceries. Such frequent/repetitive purchases may be predicted and presented to the user as possible renewal purchase amounts, or may be set as recurring authorizations on a periodic basis. Although databases 260, 270, 280 have been described as being separate databases for the purposes of the present discussion, these databases may alternately be combined into one or more databases.

Account management device 120 may also include one or more I/O devices 220 that may comprise one or more interfaces for receiving signals or input from devices and providing signals or output to one or more devices that allow data to be received and/or transmitted by account management device 120.

Figure 3:
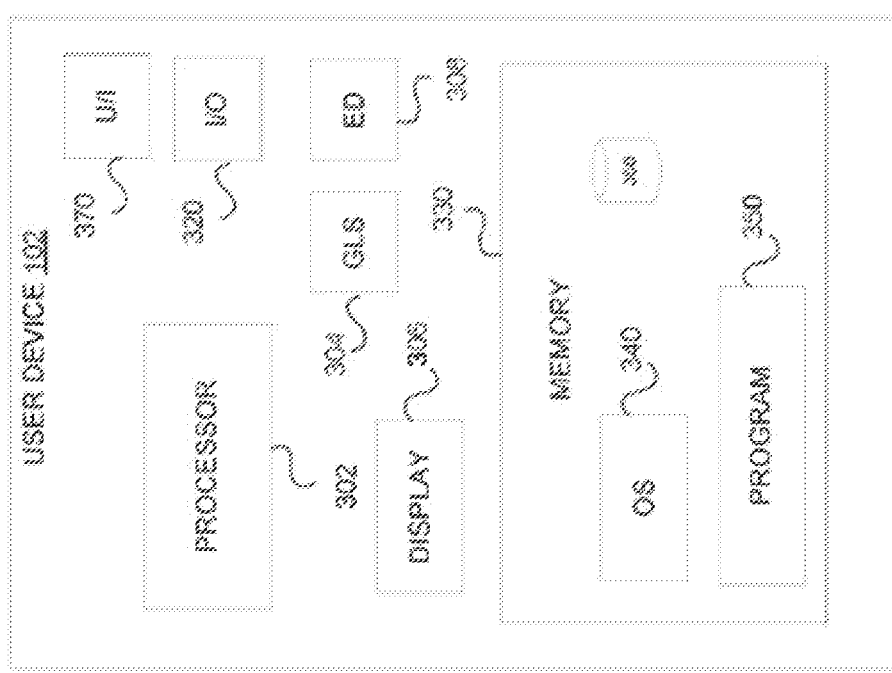
FIG. 3 is a component diagram of a user device, according to some embodiments.

FIG. 3 shows a component diagram of a user device, according to some embodiments. As shown, user device 102 may include an input/output ("I/O") device 320, a memory 330 containing an operating system ("OS") 340, a program 350, a database 360, and all associated components as described above with respect to account management device 120. User device 102 may also include an account management processor 302 for determining remaining balances of purchase authorization amounts and comparing purchase data to purchase authorization data (and other budget data) during authorization; a geographic location sensor ("GLS") 304 for determining the geographic location of user device 102; a display 306 for displaying digital images or video; a user interface ("U/I") device 370 for receiving user input data, such as data representative of a click, a scroll, a tap, a press, or typing on an input device that can detect tactile inputs; and an environmental data ("ED") sensor 308 for detecting biometric data, item data, and/or purchase data. In some embodiments, an environmental data sensor 308 may include, for example but not limited to an RFID reader, NFC transceiver, a fingerprint scanner, an eye or retina scanner, a voice recorder, a microphone, and/or a digital camera. In some embodiments, user device 102 may include one or more processors. According to some embodiments, account management processor 302 may include all of the features and functions of processor 210 described above.

Figure 4:
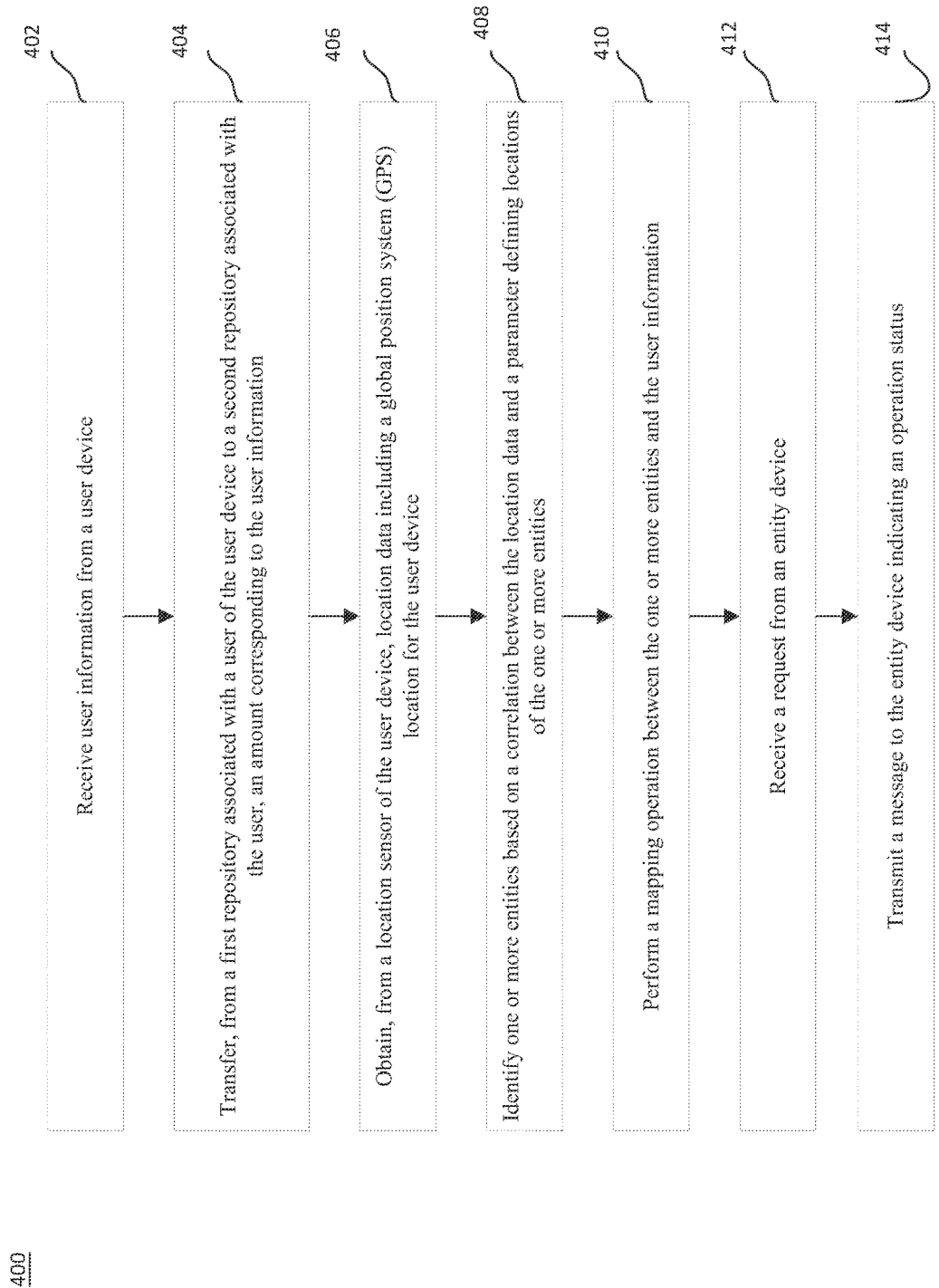
FIG. 4 is a flowchart representing a digital authorization and management method, according to some embodiments.

FIG. 4 is a flowchart representing a user action authorization signaling and management method 400, according to some embodiments. According to some embodiments, purchase authorization signaling method 400 may include receiving user information from a user device, the user information including one or more categories, as illustrated in step 402. As described herein, a user may input, via user device 102, user information relating to a purchase authorization of the user (e.g., one or more categories). For example, the user may set a purchase authorization for purchasing an item and may set a predetermined amount. The purchase authorization information may include information relating to a merchant, an item, a geographic location, and the like, as described herein. According to some embodiments, the user information may include a user specified amount that is set by the user on a user interface. According to some embodiments, the specified amount may also be set by a processor of user device 102 based on user metadata associated with the merchant (e.g., prior purchases, etc.) and can also adjust the specified amount based on the identified merchant. For example, a merchant that the user typically uses may be have average spending amounts that are typically higher/lower than a user set amount and the user device 102 may offer the user a different recommended number based on user metadata.

According to some embodiments, method 400 may also include transferring, from a first repository associated with a user of the user device to a second repository associated with the user, an amount corresponding to the user information, as illustrated in step 404. For example, upon receiving the purchase authorization information from user device 102, an organization 108 (e.g., a bank or the like) may process the purchase authorization information. This processing may include preauthorizing a future purchase associated with the user set amount and transferring an amount corresponding to the user set amount. According to some embodiments, the allocation may include transferring the amount from an account associated with the user to another account associated with the user. For example, allocating funds in an authorized account can expedite a transaction processing without requiring the initial temporary pre-purchase authorization transaction to occur, thereby conserving operational and computational resources. According to some embodiments, the funds may be a subset of repository items corresponding to a value specified by the user information. According to some embodiments, the user information may also include a category code, such as a merchant category code. Accordingly, aspects of this disclosure simplify processes by limiting the number of processes (e.g., API calls) that need to be computed. By reducing these calls, the processing power of the application is also reduced, and minimizes issues in the end user experience.

According to some embodiments, method 400 further includes obtaining, from a location sensor of the user device, location data including a global position system (GPS) location for the user device, as illustrated in step 406. For example, as discussed herein, the user may open the application running on user device 102 in order to send location data to system. In some embodiments, a beacon or other similar device may be installed at merchant location, and may transmit a signal that, when received by a user device, may trigger an application running on the user device to track the user device's location. According to some embodiments, a user may carry a transaction card (e.g., credit card) or other type of debiting device that incorporates location tracking features, such as, for example, a GPS installed in the transaction card or device.

According to some embodiments, method 400 may also include identifying one or more entities (e.g., vendors, merchants, etc.) based on a correlation between the location data (e.g., GPS or geofence data) and a parameter defining a location of the one or more entities (e.g., MCC data, detected merchandize RFID data, etc.), as illustrated in step 408. As described herein location services server 112 may store geofencing information that represents a designed location or area. According to some embodiments, the contours of a geofence may be predetermined, for example, location services server 112 may receive one or more predetermined geofences that are associated with respective locations from a third party. For example, location services server 112 may receive data representative of a geofence around a particular store from an organization associated with the store that determined the location of the geofence. In some embodiments, the contours of a geofence may be determined by receiving (e.g., from a user of system 100) the location of a point (e.g., longitude and latitude) and a radius and setting the contours of the geofence to be equal to the location of a circle drawn around the point at the specified radius. In some embodiments, a geofence may be specified by a user of system 100 by, for example, drawing the geofencing onto a virtual map or otherwise inputting the location of the geofence. According to some embodiments, location services server 112, for example, may identify one or more vendors, merchants, shopping districts, etc., based on a correlation between received geofence data (or GPS data) and correlating that information with received MCC data for example. For example, geofence data may indicate that the user is within a certain shopping district while MCC data may further indicate the store at which the user is located.

According to some embodiments, upon identifying the one or more entities, method 400 may also include performing a mapping operation (e.g., by components within organization 108 like location services server 112 and account management device 120) between the one or more entities (e.g., merchant, location, gas station, and the like) and the user information (e.g., purchase authorization information), as illustrated in step 410. According to some embodiments, systems of organization 108 may determine if a specific purchase authorization amount has been set for the identified one or more merchants (e.g., Addidas®, Addidas® store in specific location, Addidas® website, etc.).

According to some embodiments, method 400 includes receiving a request from the merchant device requesting authorization of the transaction the user is attempting to make, as illustrated in step 412.

According to some embodiments, method 400 may further include transmitting a message to the merchant device indicating an operation status, as illustrated in step 414. In one example, the message may indicate an approved transaction when it is determined at organization 108 (e.g., via, for example, transaction server 114) that a match exists between the merchant and a stored user purchase authorization amount. In an alternative example, the message may indicate a declined transaction when it is determined at organization 108 (e.g., via, for example, transaction server 114) that a match does not exist between the merchant and a stored user purchase authorization amount (e.g., no record is found of a user purchase authorization amount being set by the user). As described herein, along with the message, organization 108 (via transaction server 114) may also transmit a notification to user device 102 to alert the user of the declined transaction and provide the user with an option to authorize the transaction in real time. It can be appreciated that the message may also include a notification indicating that the request exceeds the value specified by the user information (e.g., purchase value greater than pre-authorized value) and may also send a second message to the merchant device indicating an approval operation in response to receiving an updated value within the user information. For example, a user may update the pre-authorized value when being notified that the initial purchase attempt was declined. According to some embodiments, the second message may be part of an API call response approving an initial withdrawal from the first repository. According to some embodiments, organization 108 may transmit, to user device 102, a summary associated with the one or more categories in response to transmitting the message to the merchant (e.g., pre-authorization amount increased).

According to some embodiments, method 400 may further include adjusting the purchase authorization amount in response to a user input, or in response to prior user data associated with the specific merchant. As described herein, systems of organization 108 may determine, based on a detected location of a user, that the user is at a gas station filling gas. Accordingly, systems of organization 108 (e.g., location services server 112, transaction server 114 and account management device 120) may perform the above-noted matching operation. According to some embodiments, even if a match is not found, it may be determined that filling gas is a routine reoccurring activity that can be pre-authorized and the purchase authorization amount may be adjusted. In some aspects, when a user has failed to input a purchase authorization amount, the system can simply default to a known authorization hold process.

Figure 5:
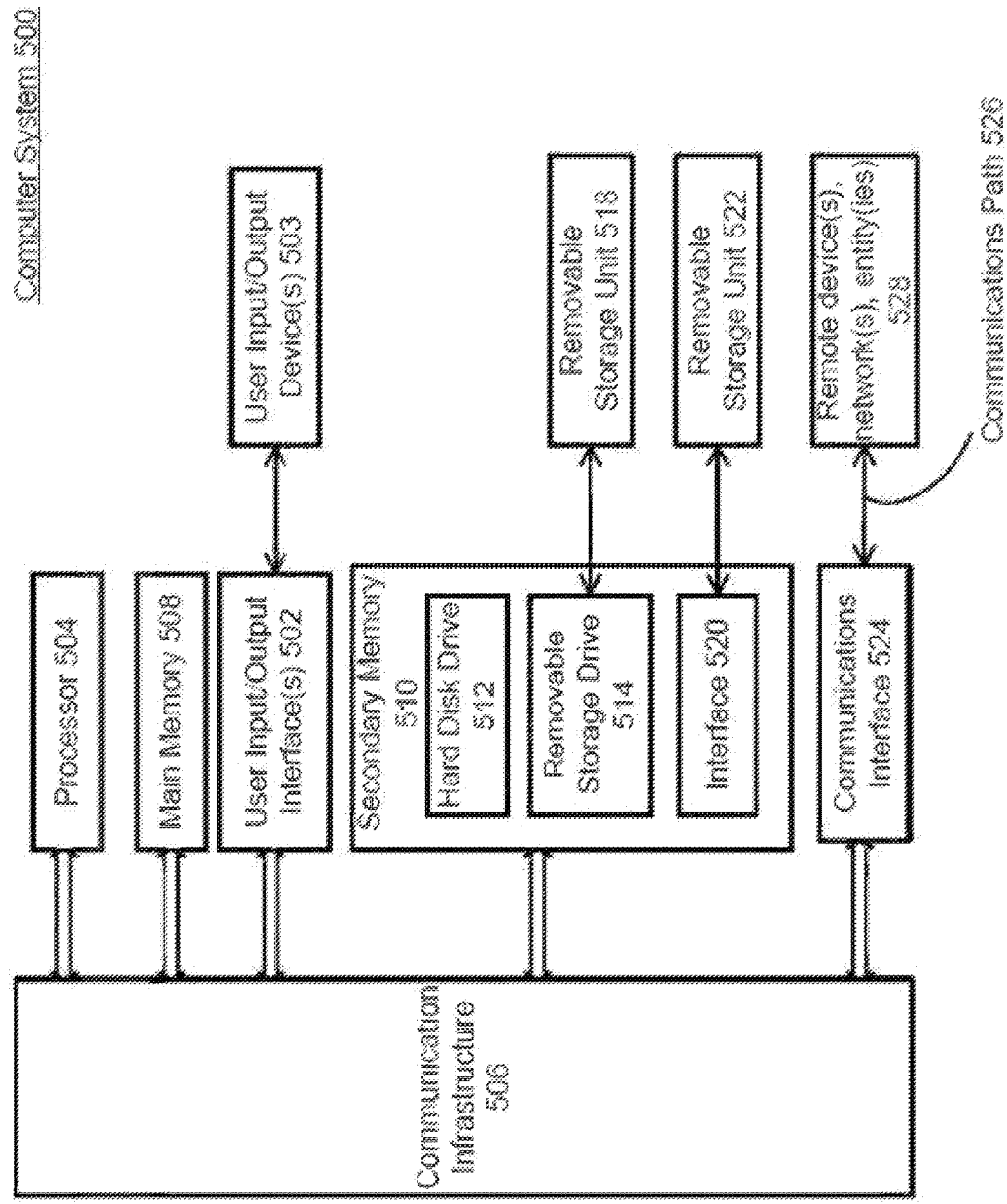
FIG. 5 illustrates a computer system that carries out the digital authorization and management method, according to some embodiments.

Various embodiments of the disclosure may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random-access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 618. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system embodiments other than those described herein.

Descriptions to an embodiment contemplate various combinations, components and sub-components. However, it will be understood that other combinations of the components and sub-components may be possible while still accomplishing the various aims of the present application. As such, the described embodiments are merely examples, of which there may be additional examples falling within the same scope of the disclosure.

What is claimed is:
1. A computing system for real-time digital authorization comprising:
    one or more processors; and a memory in communication with the one or more processors and storing instructions that, when executed by the one or more processors, are configured to cause the computing system to:
at a first time:
receive, from a user device, a pre-authorization request from a user associated with the user device, to perform a transaction with a merchant;
based on receiving the pre-authorization request, transfer, from a first repository associated with the user and to a second repository associated with the user, an amount necessary to perform the transaction based on the pre-authorization request; and
at a second time:
obtain, from a location sensor of the user device, location data including a global positioning system (GPS) location for the user device;
identify one or more merchants within a geofence based on a correlation between the location data and a geofence parameter defining locations of the one or more merchants within the geofence;
determine whether any of the one or more merchants within the geofence match the merchant based on the location data and the geofence parameter;
based on finding a match, transmit a signal to a merchant device of the merchant indicating the pre-authorization request; and
generate an instruction to the merchant device that when the transaction occurs between the merchant and the user, to perform the transaction using the amount in the second repository and without performing a temporary authorization transaction.

2. The computing system of claim 1, wherein the computing system is further configured to set the amount based on user metadata associated with the user's prior transactions with the merchant.

3. The computing system of claim 1, wherein the user device is a smart phone.

4. The computing system of claim 1, wherein the user device is a transaction card.

5. The computing system of claim 1, wherein the computing system is further configured to set the geofence based on a received user specified drawing on a virtual map.

6. The computing system of claim 1, wherein the computing system is further configured to obtain the location data based on detecting the user device has entered the geofence.

7. A method for real-time digital authorization comprising:
at a first time:
receiving, from a user device, a pre-authorization request from a user associated with the user device, to perform a transaction with a merchant;
based on receiving the pre-authorization request, transferring, from a first repository associated with the user and to a second repository associated with the user, an amount necessary to perform the transaction based on the pre-authorization request; and
at a second time:
obtaining, from a location sensor of the user device, location data including a global positioning system (GPS) location for the user device;
identifying one or more merchants within a geofence based on a correlation between the location data and a geofence parameter defining locations of the one or more merchants within the geofence;
determining whether any of the one or more merchants within the geofence match the merchant based on the location data and the geofence parameter;
based on finding a match, transmitting a signal to a merchant device of the merchant indicating the pre-authorization request; and
generating an instruction to the merchant device that when the transaction occurs between the merchant and the user, to perform the transaction using the amount in the second repository and without performing a temporary authorization transaction.

8. The method of claim 7, further comprising setting the amount based on user metadata associated with the user's prior transactions with the merchant.

9. The method of claim 7, wherein the user device is a smart phone.

10. The method of claim 7, wherein the user device is a transaction card.

11. The method of claim 7, further comprising setting the geofence based on a received user specified drawing on a virtual map.

12. The method of claim 7, further comprising obtaining the location data based on detecting the user device has entered the geofence.

13. The method of claim 7, wherein the pre-authorization request includes a purchase authorization for an item sold by the merchant.

14. A non-transitory computer readable medium with instructions stored thereon that when executed by one or more processors of a computing system, cause the computing system to perform operations comprising:
at a first time:
receiving, from a user device, a pre-authorization request from a user associated with the user device, to perform a transaction with a merchant;
based on receiving the pre-authorization request, transferring, from a first repository associated with the user and to a second repository associated with the user, an amount necessary to perform the transaction based on the pre-authorization request; and
at a second time:
obtaining, from a location sensor of the user device, location data including a global positioning system (GPS) location for the user device;
identifying one or more merchants within a geofence based on a correlation between the location data and a geofence parameter defining locations of the one or more merchants within the geofence;
determining whether any of the one or more merchants within the geofence match the merchant based on the location data and the geofence parameter;
based on finding a match, transmitting a signal to a merchant device of the merchant indicating the pre-authorization request; and
generating an instruction to the merchant device that when the transaction occurs between the merchant and the user, to perform the transaction using the amount in the second repository and without performing a temporary authorization transaction.

15. The non-transitory computer readable medium of claim 14, wherein the operations further comprise setting the amount based on user metadata associated with the user's prior transactions with the merchant.

16. The non-transitory computer readable medium of claim 14, wherein the user device is a smart phone.

17. The non-transitory computer readable medium of claim 14, wherein the user device is a transaction card.

18. The non-transitory computer readable medium of claim 14, wherein the operations further comprise setting the geofence based on a received user specified drawing on a virtual map.

19. The non-transitory computer readable medium of claim 14, wherein the operations further comprise obtaining the location data based on detecting the user device has entered the geofence.

20. The non-transitory computer readable medium of claim 14, wherein the pre-authorization request includes a purchase authorization for an item sold by the merchant.

* * * * *